United States Patent [19]

White, Jr. et al.

[11] Patent Number: 5,267,908
[45] Date of Patent: Dec. 7, 1993

[54] BELT CONSTRUCTION METHOD

[75] Inventors: Jack D. White, Jr., Springfield; Kenneth D. Richmond, Nixa, both of Mo.

[73] Assignee: Dayco Products, Inc., Dayton, Ohio

[21] Appl. No.: 875,857

[22] Filed: Apr. 29, 1992

[51] Int. Cl.⁵ ............................................. F16H 7/00
[52] U.S. Cl. ................................... 474/139; 474/153; 474/167; 474/205; 474/238; 474/252
[58] Field of Search ............... 474/100, 139, 140, 145, 474/153, 167, 189, 190, 201, 205, 237, 238, 242, 252, 268, 273

[56] References Cited

U.S. PATENT DOCUMENTS

| | | | |
|---|---|---|---|
| 3,839,116 | 10/1974 | Thomas et al. | 474/238 X |
| 3,951,006 | 4/1976 | Fisher et al. | 74/233 |
| 4,031,761 | 6/1977 | Fisher et al. | 474/238 X |
| 4,106,966 | 8/1978 | Brooks | 156/138 |
| 4,127,039 | 11/1978 | Hollaway, Jr. | 74/232 |
| 4,169,393 | 10/1979 | Wetzel et al. | 474/262 X |
| 4,254,589 | 3/1981 | Hunt et al. | 51/318 |
| 4,657,526 | 4/1987 | Tangorra et al. | 474/263 X |
| 4,822,324 | 4/1989 | Georget | 474/268 |
| 5,026,444 | 6/1991 | Hollaway | 156/137 X |

Primary Examiner—Ramon S. Britts
Assistant Examiner—Roger J. Schoeppel
Attorney, Agent, or Firm—Joseph V. Tassone

[57] ABSTRACT

The combination of an endless power transmission belt construction and a pulley therefor, the belt construction and methods of making the same are provided, the belt construction having opposed inner and outer surfaces with one surface defining a plurality of longitudinally disposed and alternately spaced apart like projections and grooves that are adapted to mesh with a ribbed surface of one pulley, and a planar surface adapted to operate on a planar surface of another pulley, wherein the planar surface of the belt construction comprises a polymeric material. The polymeric material of the planar surface provides a greater tractive force on the planar surface of the pulley. The planar surface further provides means to prevent abrasive particles accumulating thereon, thereby reducing wear upon the planar surface of the pulley.

10 Claims, 2 Drawing Sheets

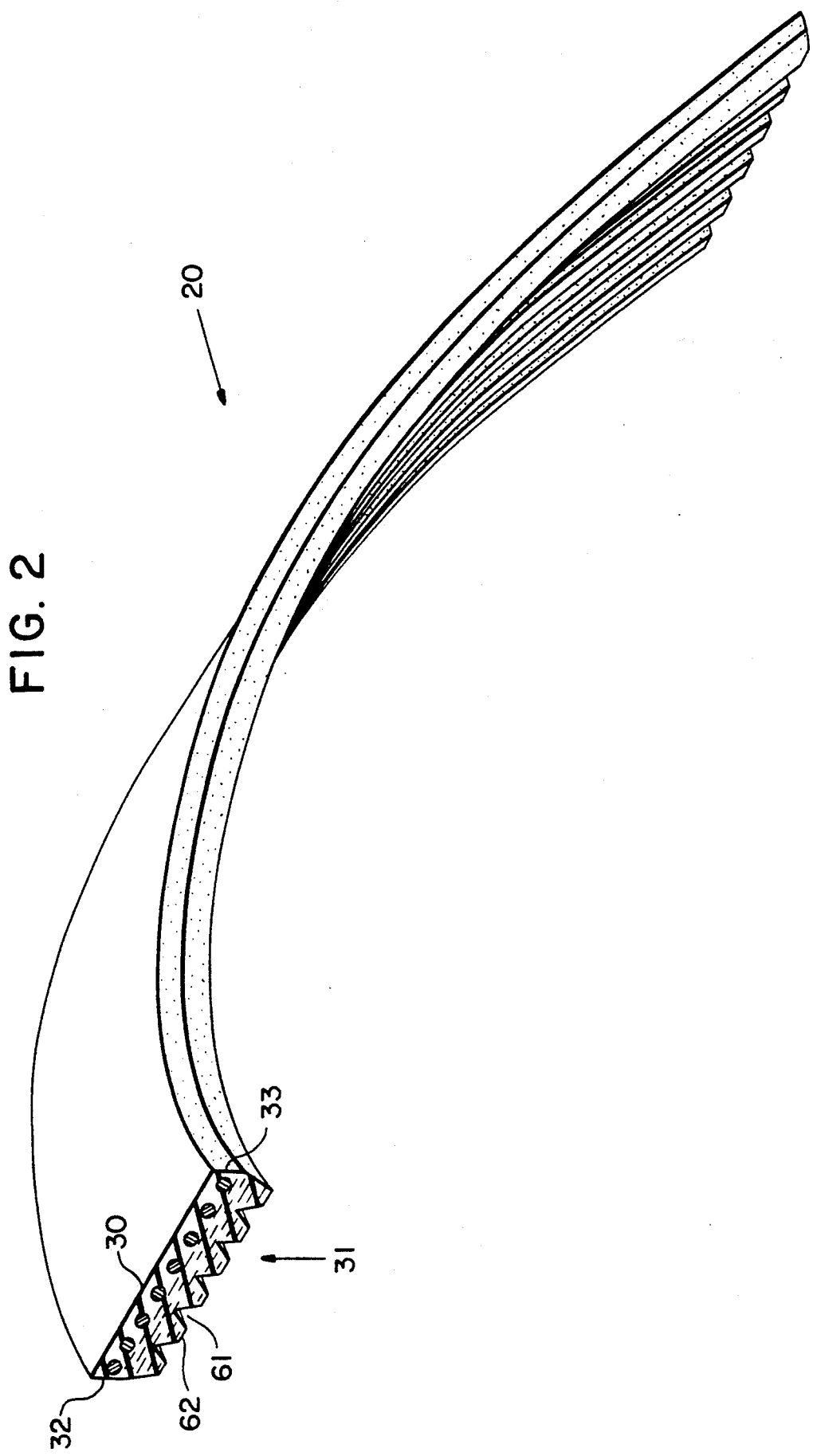

BELT CONSTRUCTION METHOD

BACKGROUND OF THE INVENTION

1. Field of the Invention

This invention relates to a new endless power transmission belt construction and to a new combination of the belt construction and rotatable pulley means as well as to new methods of making the same.

2. Prior Art Statement

It is known to provide the combination of an endless power transmission belt construction having opposed side edge means and having opposed inner surface means and outer surface means with said inner surface means defining a plurality of longitudinally disposed and alternately spaced apart like projections and grooves, said outer surface means being a substantially flat surface, a first rotatable pulley means having an outer peripheral ribbed surface means meshing with a portion of the inner surface means of said belt construction and a second rotatable pulley means having an substantially flat outer surface means adapted to operate against said flat outer surface means of said belt construction, the outer flat surface thereof being adapted to be a driving surface for substantially flat surface of said second pulley means. For example, U.S. Pat. No. 3,951,006 to Fisher, et al.

It is also known to provide an endless power transmission belt construction comprising a matrix made from an elastomeric material. For instance, see U.S. Pat. No. 4,822,324 to Georget.

It is also known to provide an endless power transmission belt construction having at least one of the tension section, compression section or load carrying section comprised of a rubber matrix having a plurality of discrete aramid fibers embedded therein. For instance, see U.S. Pat. No. 4,127,039 to Hollaway, Jr.

SUMMARY OF THE INVENTION

It is one feature of this invention to provide a new endless power transmission belt construction having a ribbed surface means that cooperates with a ribbed surface of one pulley means and a planar surface means adapted to engage a planar surface of another pulley means in a manner to overcome some of the problems associated with the prior known belt construction wherein the interstices of the fabric on the flat driving surface of the belt construction tends to trap abrasive particles from the environment.

In particular, it has been found that such prior known ribbed belt constructions having a flat fabric surface on one side of the belt construction tend to trap abrasive particles from the environment, and especially from dusty, dirty or sandy environs, between the bundles of fibers comprising the fabric which contributes to a significant reduction in the life of the pulley means by tending to wear away the surface of said pulley means in a manner similar to grinding or sanding.

However, it was found according to the teachings of this invention that the flat driving surface comprising polymeric material on one side of the belt construction tends to prevent such abrasive particles from accumulating on the flat driving surface thereof thereby tending to decrease the wear on the pulley surface thereof over the prior known belt construction.

It is another feature of this invention to provide a new endless power transmission belt construction that has a flat driving surface that cooperates with a planar surface of a pulley means in a manner to overcome some of the problems associated with the prior known belt construction wherein the fabric on the flat driving surface of the belt construction tends to slip under high load applications. In particular, it has been found that such prior known ribbed belt constructions having a flat textured fabric surface have a relatively low coefficient of friction which contributes to a significant reduction in the tractive force on the planar surface of said pulley means.

It was found therefore, according to the teachings of this invention that the flat driving surface comprising polymeric material on the one side of the belt construction tends to provide increased tractive force between the flat driving surface thereof and the planar pulley surface thereof.

Accordingly, it is an object of this invention to provide a new endless power transmission belt construction having one or more of the novel features of this invention as set forth above or hereinafter shown or described.

Another object of this invention is to provide a new method of making such an endless power transmission belt construction, the method of this invention having one or more of the novel features of this invention as set forth above or hereinafter shown or described.

Another object of this invention is to provide a new combination of an endless power transmission belt construction and a rotatable pulley means therefor, the combination of this invention having one or more of the novel features of this invention as set forth above or hereinafter shown or described.

Another object of this invention is to provide a new method of making such a combination, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 2 is a fragmentary isometric view of the belt construction of the instant invention.

DESCRIPTION OF THE PREFERRED EMBODIMENTS

Figure 1:
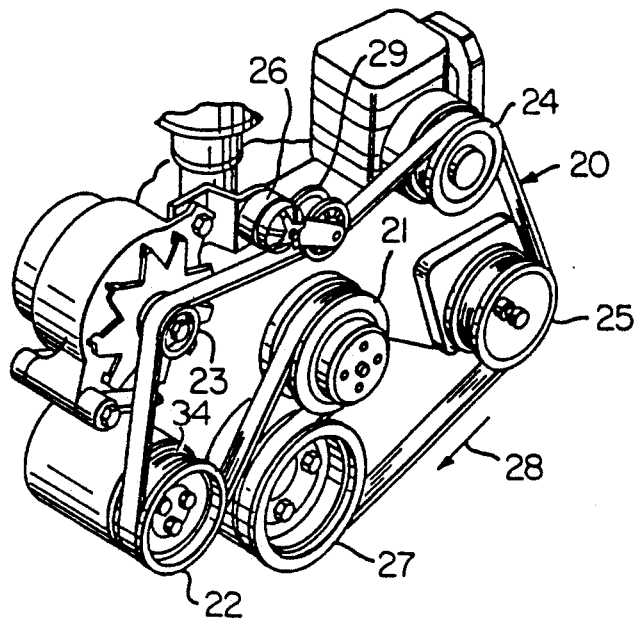
FIG. 1 is a fragmentary isometric view looking toward the front end of an automobile engine which utilizes a ribbed belt construction.

While the various features of this invention are hereinafter illustrated and described as being particularly adapted to provide belt constructions for use with pulley means of an internal combustion engine, it is to be understood that the various features of this invention can be utilized singly or in various combinations thereof to provide belt constructions for other types of apparatus as desired.

Therefore, this invention is not to be limited to only the embodiments illustrated in the drawings, because the drawings are merely utilized to illustrate one of the wide variety of uses of this invention.

Referring now to FIG. 1, an automobile engine (not shown) utilizes an endless power transmission belt construction 20 for driving a plurality of driven accessories as hereinafter set forth. A belt tensioner is indicated by the reference numeral 26 and is utilized to provide a tensioning force on the belt construction 20 in the manner fully set forth in U.S. Pat. No. 4,596,538, to Henderson, whereby this U.S. patent is being incorporated into this disclosure by this reference thereto.

The pulley means 22, 23, 24, 25, and 27 of FIG. 1, have ribbed outer peripheral surface means 34 against which the inner surface means 31 of the belt construction 20 shown in FIG. 2, meshes in its driving relation therewith. Such ribbed surface means 34 defines a plurality of longitudinally disposed and alternately spaced apart like projections and grooves that respectively have portions thereof for serially meshing respectively with cooperating portions of grooves 61 and projections 62 of the inner surface means 31 of the belt construction 20 in a manner well known in the art as set forth in the aforementioned U.S. Pat. No. 3,951,006 to Fisher, et. al. incorporated herein by this reference thereto.

The belt construction 20 is driven in the direction 28 by a driving sheave or pulley means 27 which is operatively interconnected to the crank shaft of the engine in a manner well known in the art. The driving sheave 27 drives the belt construction 20 in an endless path and thereby drives a sheave or pulley means 25 of a power steering device (not shown) utilized on the engine of the automobile, a sheave or pulley means 21 of an engine water pump, a sheave or pulley means 22 of an air pump of a type used in an anti-pollution system for the engine, a sheave or pulley means 23 of an engine electrical alternator, a sheave or pulley means 24 of a compressor of an air conditioning system, and idles on a sheave 29 of tensioner 26 providing tension for the belt construction 20 for the automobile utilizing the engine.

The endless power transmission belt 20 of this invention shown in FIG. 2, is made primarily of polymeric material and has a polyester load carrying cord means 37, disposed in a load carrying section 56, in a manner conventional in the art. The belt construction 20 further has opposed inner surface means 31, of a compression section 55, disposed on one side of said load carrying section 56, and a substantially flat driving surface 30, of a tension section 57, disposed on the opposite side of said load carrying section 56. Inner surface means 31 is ribbed and thereby has a plurality of longitudinally disposed and alternately spaced apart like projections 62, and grooves 61, disposed substantially parallel and intermediate opposed side edges 32 and 33, of the belt construction 20 in a manner well known in the art. For example, see the U.S. patent to Thomas et al, U.S. Pat. No. 3,839,116, whereby this U.S. patent is also being incorporated into this disclosure by this reference thereto.

Figure 3:
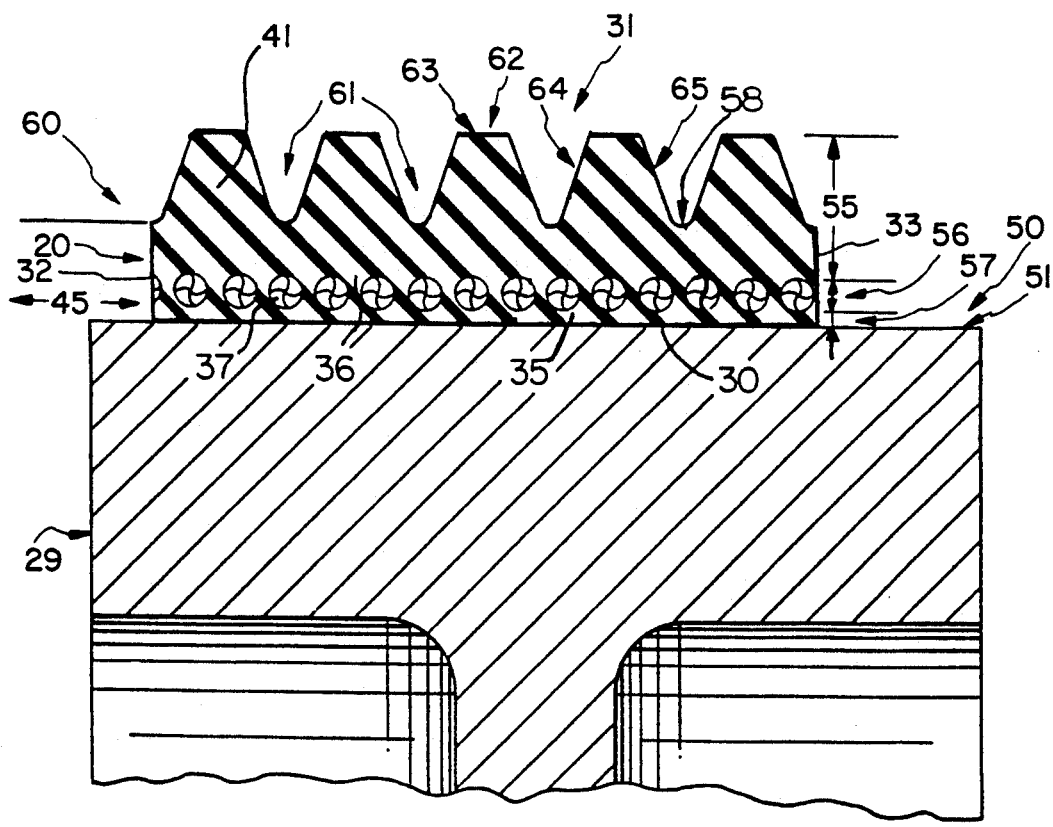
FIG. 3 is a section view of one of the planar pulleys 21 or 29 of FIG. 1 with the belt construction of this invention thereon.

It can be seen from FIG. 1 and FIG. 3, that the belt construction 20 comprises a flat driving surface 30 which is disposed against the outer peripheral surface 50 of the sheave or pulley means 21 to cause a driving relation therewith. The outer peripheral surface 50 of the sheave or pulley means 21 may have a substantially flat or planar surface 51. The flat driving surface 30 of the belt construction 20 is also adapted to run against the outer peripheral surface 50 of another pulley means 29 whereby the belt construction 20 engaging against such planar surface 51 provides no driving force thereon also in a manner well known in the art.

In the prior art belt construction, the interstices of the fabric cause the flat driving surface to be somewhat rough or textured. It is well known that, during the rotation of the belt construction 20, there is relative sideways motion about pulley means 21 or 29, indicated by double ended arrow 45, between belt construction 20 and outer peripheral surface 50. Additionally, relative motion in the direction of rotation is present on pulley means 21 due to creep during the transmission of torque. It has been determined that this relative motion tends to abrade the planar surface 51 of pulley means 21 or 29 when the prior art belt construction with a fabric outer surface operates in a severe environment where dust or sand is present. Such dust or sand may become ingested into the area of the belt construction 20 by the operation of the cooling fan, (not shown) which may be mounted on the end of pulley means 21. The dust or sand becomes trapped in the rough or textured surface of the fabric and in fact becomes embedded between the fibers of the individual yarns of fabric. Such dust or sand then becomes an abrasive substance which when coupled with the relative motion between belt construction 20 and pulley means 21 or 29, tends to abrade away the planar surface 51 of pulley means 21 or 29. It is obvious that such relative motion is not present on pulleys means 22, 23, 24, 25 and 27 as inner ribbed surface 31 engages longitudinally disposed grooves 38 and projections 39 of said pulley means.

Heretofore, such abrasion was not of great concern in the operation of the automobile as the pulley means 21 and 29 were primarily formed from steel and a driving relationship from the flat driving surface 30 was not prevalent, however as is well known in the art, pulley means 21 and 29 are increasingly being manufactured of a polymeric substance such as glass filled nylon. It has been found that an abrasive substance can destroy the planar surface 51 of a polymeric pulley means 21 or 29 and in an extremely severe environment can also severely damage the planar surface 51 of a steel pulley means 21 or 29.

Reference is now made to FIG. 3, wherein the combination of the belt construction 20 of this invention with flat driving surface 30 is looped around or against the tensioner pulley means 29 or water pump pulley means 21, reference numeral 29 being used hereafter for clarity, and is contiguous with the planar surface 51 thereof. Flat driving surface 30 has a closed grain structure, characteristic of vulcanized polymers, unlike the interstices of fabric of the prior art belts, and as such tends to prevent foreign particles from accumulating on the flat driving surface 30 thereof as no means to capture said particles exists on flat driving surface 30. It is readily recognized therefore, that during the operation of the belt construction 20 about pulleys means 29, the relative sideways motion, indicated by double ended arrow 45, between belt construction 20 and planar surface 51 cannot cause the abrasive action present in the prior art combinations as there is little, if any, abrasive material captured on the flat driving surface 30 thereof.

As best illustrated in FIG. 2, the belt construction 20 of this invention is defined between opposed side edges 32 and 33 and has a tension section 57, an intermediate load carrying section 56, and a compression section 55. The intermediate load carrying section 56 comprises a polymeric cushion material 36 and cord means 37 disposed therein and wherein the cord means 37 is continuously helically wound throughout the length of the belt construction 20. The compression section 55, comprising polymeric material 41, is secured to and contiguous with the load carrying section 56 and defines an inner surface means 31 of the belt construction 20 upon the exposed surface thereof. It can be seen that the compression section 55 has disposed in the inner surface means 31 thereof, a plurality of longitudinally disposed and alternately spaced apart like projections 62 and grooves 61, the grooves 61 each having an arcuate root 58 while each projection 62 has a generally truncated configuration defined by a flat surface 63 and a pair of opposed converging side walls 64 and 65 as illustrated.

Opposite the compression section 55 is the tension section 57 comprising polymeric material 35, upon which is defined a substantially flat driving surface 30. Flat driving surface 30 may be provided by means such as molding, grinding, sanding or cutting of the polymeric material 35 such that flat driving surface 30 is smooth. In a similar manner, the inner surface means 31 has grooves 61 and projections 62 formed therein by means such as cutting, milling, molding or grinding all in a manner known in the art.

While the materials forming the belt construction 20 of this invention can comprise any suitable polymeric material, all in the manner well known in the art, it is to be understood that the various layers of the belt construction of this invention may also be provided with reinforcing means therein, such as reinforcing fibers means 59 illustrated in FIG. 2 for any or all of the polymeric materials 41, 36 or 35 of the sections 55, 56 and 57, respectively. Of course, polymeric materials 41, 36 and 35 may be identical whereby the layers would have a uniform appearance and could not be distinguished one from the other.

In one working embodiment of the belt construction 20 of this invention, the polymeric cushion material 36 of the load carrying section 56 contains about 4 phr of reinforcing fiber means 59, such as the well known stiflex material, with the reinforcing fibers running circumferentially around the belt construction 20. The polymeric material 41 of the compression section 55 contains about 15 phr of reinforcing fiber means 59 and is laid transverse the longitudinal axis of the belt construction 20 such that the reinforcing fibers means 59 are substantially oriented across the width of the belt construction 20 as shown in FIG. 3. The polymeric material 35 of the tension section 57 also contains about 15 phr reinforcing fiber means 59 therein with the reinforcing fibers means 59 also substantially oriented transverse the longitudinal axis of belt construction 20 in the same manner as the polymeric material 41. The polymeric material 36 of the load carrying section 56 is generally very thin and as such is very difficult to lay transversely as it has very little strength in the cross direction and would stretch easily during manufacture of belt construction 20.

Of course, there are methods of manufacturing belt construction 20 which allow the reinforcing fibers means 59 of polymeric cushion material 36 to be transversely laid however, it has been found that the construction described above provides a flexible power transmission belt construction 20 which has sufficient transverse rigidity for the driving forces acting upon side walls 64 and 65 of longitudinally disposed projections 62. Flat driving surface 30 of belt construction 20 may be provided in any manner known in the art such as by machining a molded polymeric surface utilizing a flat cutter bar similar to the rake like cutters disclosed in U.S. Pat. No. 4,329,192 to White, Jr., et al., or a flat portion of a grinding wheel as shown in U.S. Pat. No. 3,822,516 to Huber, wherein these U.S. patents are being incorporated into this disclosure by this reference thereto. Of course, flat driving surface 30 may be molded against a smooth surface of a mold as shown in the aforementioned U.S. Pat. No. 4,329,122 to White, Jr., et al., or the platen of a press in order to provide a smooth nature to flat driving surface 30, however, it has been found by the teachings of this invention that a machined surface provided by a flat cutter bar provides the best smooth surface. Such smooth surface thus provides the dual function of providing a greater tractive force for operation against the planar surface of pulley means 29 and the flat driving surface 30 required to prevent capture of fine abrasive particles thereon preventing wearing away of planar surface 51.

It was found, according to the teachings of this invention, that the tractive force of the flat driving surface 30 was increased over the tractive force of the prior art belt with a flat fabric surface by providing a smooth surface as described above. A test was conducted utilizing at least two pulley means 29 having planar surface 51, wherein at least one pulley means 29 was driven by a prime mover such as an electric motor and at least one other pulley means 29 was attached to a load absorbing device. The belt construction tested was placed over the pulleys with the flat driving surface 30 in contact with the planar surface 51 of pulley means 29 and the total tension listed below applied to the belt. The belt construction was then rotated by the prime mover and the maximum horsepower transmitted to the load absorbing device was determined at the point where the belt construction began to lose tractive force. Reference to Table 1 shows that the belt construction 20 of this invention transmitted 20 horsepower at the same total tension required to transmit only 16.7 horsepower with the prior art belt.

TABLE 1

| Construction | Total Tension | Horsepower |
| --- | --- | --- |
| Fabric Surface | 105 | 6.7 |
|  | 165 | 10.0 |
|  | 210 | 13.3 |
|  | 280 | 16.7 |
| Smooth Rubber Surface | 165 | 13.3 |
|  | 210 | 16.7 |
|  | 280 | 20.0 |

It is readily apparent from the data in Table 1, therefore, that the smooth surface produced by means such as machining or molding of flat driving surface 30 as previously mentioned provides a higher tractive force on the flat driving surface 30 of the belt construction 20 of this invention.

To determine the effects of temperature, speed, type of backing, amount of abrasive volume and belt tension upon various belt constructions and pulley means 29, a half-fractional factorial empirical model described in *STATISTICS FOR EXPERIMENTERS*; George Box, et al.; John Wiley & Sons, 1978; chapter 12, page 374–417 was used. In a half-fractional factorial, the experimenter chooses one-half of the test parameters ensuring that all desired effects are included. For the five effect experiment listed, sixteen (16) tests are required which is derived from ½ ($2^5$). In this experiment, abrasive quantity and belt tension resulted in considerable wear upon the peripheral surface 50 as would have been expected but the type of backing was the most significant effect. These single variable effects and two potentially important two-way interactions, belt backing vs. belt tension and tension vs. speed warranted further experimentation. It was apparent from the half-fractional factorial that temperature or temperature related interactions had little effect upon pulley wear and were not included in the later test.

Therefore, a full factorial wear experiment was conducted utilizing the parameters in Table 2.

TABLE 2

| Variable name | Low | High | Units |
|---|---|---|---|
| Belt Tension | 50 | 200 | lbs |
| Belt backing | Rubber | Fabric | |
| Abrasive volume | 0.5 | 3 | cups |
| Driver speed | 1000 | 5000 | rpm |

These tests were conducted in an enclosed chamber where the environment was controlled by means such as recirculating forced air fans. By such means, the temperature or the amount of abrasive material may be controlled independently or such effects may be combined. Other independent control means were provided for the speed and for the tension.

The full factorial design model is also described in chapters 9, 10 and 11 of the aforementioned book, *STATISTICS FOR EXPERIMENTERS*. As explained in the book, all sets of parameters are tested such that a full surface plot of all effects may be developed if desired.

Again, sixteen (16) tests are required as derived from ($2^4$). In this experiment, a surface plot was unnecessary as the most significant effect was the type of backing surface on the belt. In both experiments, the wear upon a pulley means 29 with a polymeric surface such as planar surface 51 of FIG. 3, was determined by measuring the loss in cubic inches of pulley volume. Table 3 shows the most significant effects including the combination effects where listed.

TABLE 3

| Variable Name | Volume loss $10^{-3}$ cu. in. |
|---|---|
| Backing | 80 |
| Abrasive Quantity vs. Speed | 35 |
| Tension | 35 |
| Abrasive Quantity | 25 |
| Tension vs. Backing | 22 |

Table 4 lists the actual data generated from the full factorial test. Table 4 is grouped with a direct comparison of the flat driving surface of the prior art belt and the flat driving surface 30 of the belt construction of this invention for each set of parameters.

TABLE 4

| WEIGHT LBS | BACKING TYPE | SAND CUPS | SPEED RPM | VOLUME LOSS $10^{-3}$ CU. IN. |
|---|---|---|---|---|
| 100 | Rubber | 3.0 | 5000 | 0.0 |
| 100 | Fabric | 3.0 | 5000 | 42.0 |
| 100 | Rubber | 0.5 | 5000 | 0.0 |
| 100 | Fabric | 0.5 | 5000 | 67.0 |
| 400 | Rubber | 0.5 | 1000 | 9.0 |
| 400 | Fabric | 0.5 | 1000 | 82.0 |
| 100 | Rubber | 0.5 | 1000 | 15.0 |
| 100 | Fabric | 0.5 | 1000 | 33.0 |
| 400 | Rubber | 0.5 | 5000 | 16.0 |
| 400 | Fabric | 0.5 | 5000 | 154.0 |
| 400 | Rubber | 3.0 | 5000 | 37.0 |
| 400 | Fabric | 3.0 | 5000 | 119.0 |
| 400 | Rubber | 3.0 | 1000 | 39.0 |
| 400 | Fabric | 3.0 | 1000 | 163.0 |

TABLE 4-continued

| WEIGHT LBS | BACKING TYPE | SAND CUPS | SPEED RPM | VOLUME LOSS $10^{-3}$ CU. IN. |
|---|---|---|---|---|
| 100 | Rubber | 3.0 | 1000 | 43.0 |
| 100 | Fabric | 3.0 | 1000 | 140.0 |

It is apparent from a review of the data in Table 3 that the backing reduces the wear on the planar surface 51 by at least half, viz. 15 vs 33. The flat driving surface of the prior art belt comprised of fabric or the flat driving surface 30 of the belt construction 20 constitutes the backing in the experiment. It is readily apparent therefore, that the smooth surface produced by means such as machining or molding of flat driving surface 30 as previously mentioned provides a wear reducing surface on the flat driving surface 30 of the belt construction 20 of this invention.

It is to be understood that in order to increase the flexibility of the belt construction 20 of this invention, the same could be cogged on the inner surface means 31 thereof if desired, with a plurality of spaced apart grooves that extend substantially perpendicular to the longitudinal axis of the belt construction 20. If desired, the grooves may be the same depth as the grooves 61 in inner surface means 31. However, it is to be understood that the depth of the cogging grooves as well as the spacing therebetween could be different, irregular, etc., rather than uniform as is provided in the U.S. Pat. No. 4,938,736, to Miranti, Jr., whereby this patent is being incorporated into this disclosure by this reference thereto.

Thus, it can be seen that this invention not only provides a new combination of a belt construction and pulley means therefor, but also this invention provides a new belt construction and a new method of making the same.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in that portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a power transmission belt having a tension section, a compression section and a load-carrying section disposed therebetween, said tension section comprising a flat driving surface and said compression section comprising a ribbed driving surface; the improvement wherein said flat driving surface comprises a smooth non-textured closed grain structure free of interstices and tending to prevent accumulation of abrasive particles thereon.

2. A power transmission belt as in claim 1 wherein said tension section comprises a polymeric material.

3. A power transmission belt as in claim 1 wherein said flat driving surface is molded smooth.

4. A power transmission belt as in claim 1 wherein said flat driving surface is machined smooth.

5. A power transmission belt as in claim 4 wherein said machined smooth flat driving surface is ground.

6. A power transmission belt as in claim 4 wherein said machined smooth flat driving surface is cut with a flat cutter bar.

7. A power transmission belt as in claim 1 wherein said tension section contains fiber means therein.

8. A power transmission belt as in claim 7 wherein said fiber means is disposed transverse the longitudinal axis of said belt.

9. A power transmission belt as in claim 7 wherein said fiber means is disposed parallel the longitudinal axis of said belt.

10. A power transmission belt as in claim 7 wherein said tension section contains about 15 parts per hundred of said fiber means.

* * * * *